United States Patent [19]

Tsujikawa

[11] Patent Number: 5,168,382

[45] Date of Patent: Dec. 1, 1992

[54] OPTICALLY ADDRESSED LIQUID CRYSTAL LIGHT VALVE AND OPTICAL LOGIC DEVICE USING THE SAME

[75] Inventor: Susumu Tsujikawa, Tokyo, Japan

[73] Assignee: NEC Corporation, Tokyo, Japan

[21] Appl. No.: 793,005

[22] Filed: Nov. 15, 1991

[30] Foreign Application Priority Data

Nov. 16, 1990 [JP] Japan ............................ 2-312032

[51] Int. Cl.[5] ............................ G02F 1/13; G03B 21/00
[52] U.S. Cl. .................................... 359/56; 359/58; 359/59; 359/72; 359/86; 353/31
[58] Field of Search ................ 359/54, 56, 58, 59, 359/72, 85, 86; 353/30, 31, 122

[56] References Cited

U.S. PATENT DOCUMENTS

| | | | |
|---|---|---|---|
| 4,884,875 | 12/1989 | Okumura | 359/72 |
| 4,925,276 | 5/1990 | McMurray, Jr. et al. | 359/72 |
| 4,941,735 | 7/1990 | Moddel et al. | 359/72 |
| 5,046,828 | 9/1991 | Takanashi et al. | 359/72 |

FOREIGN PATENT DOCUMENTS

| | | | |
|---|---|---|---|
| 0375165 | 6/1990 | European Pat. Off. | 359/72 |
| 0094322 | 4/1989 | Japan | 359/72 |
| 0058029 | 2/1990 | Japan | 359/72 |

*Primary Examiner*—Janice A. Howell
*Assistant Examiner*—Huy K. Mai
*Attorney, Agent, or Firm*—Sughrue, Mion, Zinn, Macpeak & Seas

[57] ABSTRACT

An optically addressed liquid crystal light valve includes a first substrate on which a plurality of liquid crystal driving circuits are formed, a second substrate provided with a transparent electrode, and a ferroelectric liquid crystal sandwiched between the two substrates. Each liquid crystal driving circuit includes a plurality of photodetectors and a logic circuit. An optical logic device includes an optically addressed liquid crystal light valve explained above and a plurality of masks for selectively transmit a plurality of lights. The masks may be replaced by a wavelength selecting filter including a plurality of regions each transmit a light having a specific wavelength to a corresponding photodetector of the light valve.

7 Claims, 9 Drawing Sheets

OPTICALLY ADDRESSED LIQUID CRYSTAL LIGHT VALVE AND OPTICAL LOGIC DEVICE USING THE SAME

FIELD OF THE INVENTION

This invention relates to an optically addressed liquid crystal light valve and an optical logic device using the same, and more particularly to, an optically addressed liquid crystal light valve used in optical information processing, optical computing, etc. and an optical logic device using the same.

BACKGROUND OF THE INVENTION

An optically addressed liquid crystal light valve is used widely in the field of optical information processing, optical computing, etc. A first conventional optically addressed liquid crystal light valve which is well known is one manufactured by Hughes Aircraft Company of the U.S. In the optically addressed liquid crystal light valve, nematic liquid crystal is sandwiched between a glass substrate and an opposite substrate. The glass substrate is provided with a plurality of photoconductors of CdS and dielectric mirrors, and the opposite substrate is provided with a transparent electrode.

On the other hand, an optical arithmetic process carried out by an optical logic device using such an optically addressed liquid crystal light valve has been disclosed in an article titled "DIGITAL OPTICAL COMPUTING" on pages 758 to 779 of PROCEEDING OF THE IEEE, Vol. 72, No. 7, July 1984. In the optical arithmetic process, AND and OR arithmetic processes, and so on, are carried out between two input images by using optical threshold characteristic of a reading light relative to a writing light in the optically addressed liquid crystal light valve.

A second conventional optically addressed liquid crystal light valve is described in the previous text 30a-ZD-8 of 50th science lecture of APPLIED PHYSICS SOCIETY. In the optically addressed liquid crystal light valve, amorphous silicon and ferroelectric liquid crystal are used instead of CdS and nematic liquid crystal, and optical arithmetic processes using the light valve are carried out. The light valve has an advantage of high speed operation, because ferroelectric liquid crystal used therein has higher speed of response by two or three figures compared with nematic liquid crystal.

According to the conventional optically addressed liquid crystal light valve, however, there are disadvantages as explained below. In the first conventional optically addressed liquid crystal light valve, the speed of response which is determined by the speed of response of CdS and nematic liquid crystal is as low as up to 30 ms. Such a low speed of response of the light valve may become obstacles to higher speed operation of optical arithmetic processes. Further, the optical contrast thereof is not high because the change of voltage applied across the liquid crystal is low between binary states. The voltage applied across the liquid crystal is determined by a capacitance dividing ratio of the photoconductor and the dielectric mirror composing the light valve. Capacitance of the dielectric mirror will not change even if capacitance of the photoconductor changes, so that the voltage applied to the liquid crystal will not change largely. Such a low contrast thereof may not badly affect optical arithmetic processes if the light valve is used discretely in the processes, because outputs of the optical arithmetic processes are supplied as binary data of states of bright and dark. However, it is difficult to supply outputs correctly from the previous stage of the light valve to inputs of the next stage thereof in case that a plurality of light valves are connected serially to form a multi-stage structure if the contrast is not sufficiently high. Additionally, it is difficult to carry out different arithmetic processes such as AND, OR or exclusive OR processes simultaneously in one light valve, because the arithmetic processes are carried out by using optical threshold characteristic of a reading light relative to a writing light in the light valve. The whole surface of the light valve is uniform and only one of either arithmetic process can be carried out, so that it is difficult to carry out two or more kinds of arithmetic processes simultaneously.

In the second conventional optically addressed liquid crystral light valve, the speed of response is improved as compared with that of the first conventional optically addressed liquid crystal light valve, however, the same disadvantages of the low contrast and single-arithmetic-process ability as in the first conventional optically addressed liquid crystal remain.

SUMMARY OF THE INVENTION

Accordingly, it is an object of the invention to provide an optically addressed liquid crystal light valve having high speed of response and an optical logic device using the same.

It is another object of the invention to provide an optically addressed liquid crystal light valve having high optical contrast and an optical logic device using the same.

It is a further object of the invention to provide an optically addressed liquid crystal light valve in which two or more kinds of optical arithmetic processes can be carried out simultaneously and an optical logic device using the same.

According to a first feature of the invention, an optically addressed liquid crystal light valve comprises:

a first substrate on which a plurality of liquid crystal driving circuits are formed;

a second substrate provided wtih a transparent electrode; and a ferroelectric liquid crystal sandwiched between the first and second substrates;

wherein each the liquid crystal driving circuit comprises;

a plurality (n) of photodetectors for detecting lights to be converted to electric signals;

a logic circuit controlled by the electric signals supplied from the photodetectors; and pixel electrodes applied with a predetermined voltage as a result of a logic calculation in the logic circuit, whereby a predetermined electric field is applied across the transparent electrode and each the pixel electrode.

According to a second feature of the invention, an optical logic device comprises:

an optically addressed liquid crystal light valve comprising a first substrate on which a plurality of liquid crystal driving circuits are formed, a second substrate provided with a transparent electrode and a ferroelectric liquid crystal sandwiched between the first and second substrates, wherein each the liquid crystal driving circuit comprises a plurality (n) of photodetectors for detecting lights to be converted to electric signals, a logic circuit controlled by the electric signals supplied from the photodetectors, and pixel electrodes applied with a predetermined voltage as a result of a logic calculation in the logic circuit, whereby a predetermined electric field is applied across the transparent electrode and each the pixel electrode;

a plurality (n) of masks for selectively transmit a plurality (n) of lights to corresponding photodetectors of the optically addressed liquid crystal light valve;

an optical combining system for combining the plurality (n) of lights; and an optical focusing system for focusing the combined light.

BRIEF DESCRIPTION OF THE DRAWINGS

The invention will be explained in more detail in conjunction with appended drawings wherein.

DESCRIPTION OF THE PREFERRED EMBODIMENTS

Figure 1:
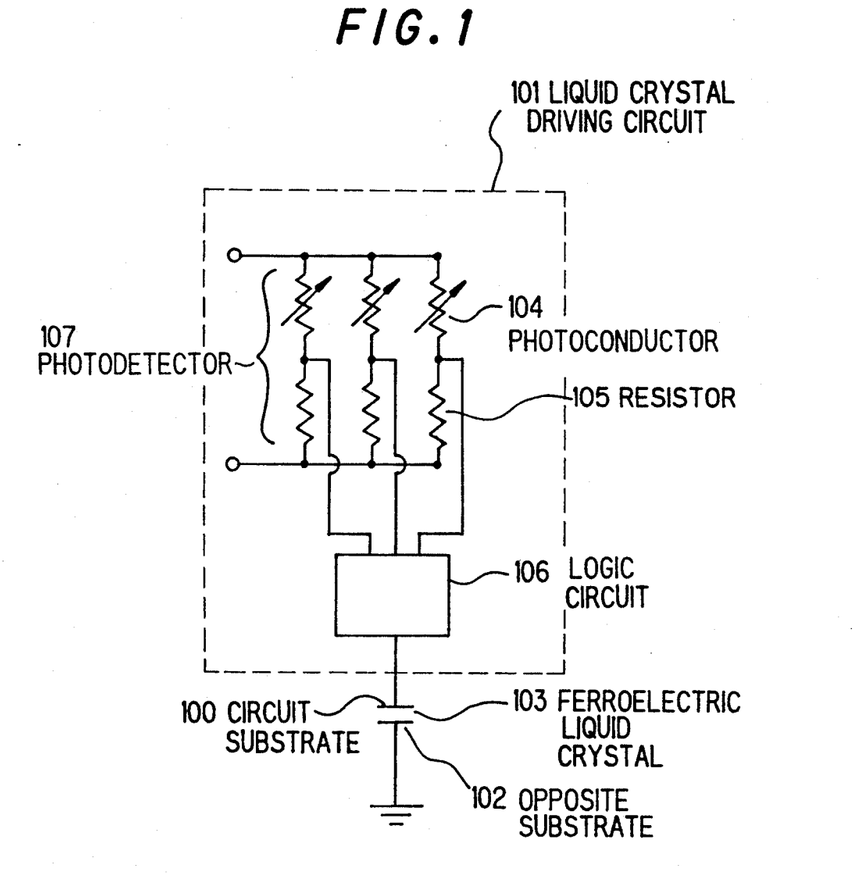
FIG. 1 is a block diagram of an optically addressed liquid crystal light valve in a preferred embodiment according to the invention.

FIG. 1 shows an optically addressed liquid crystal light valve in a preferred embodiment according to the invention. The optically addressed liquid crystal light valve includes a circuit substrate 100 on which a plurality of liquid crystal driving circuits 101 are formed in line or in plane (though only one liquid crystal driving circuit 101 is shown in FIG. 1), an opposite substrate 102 which is connected to ground, and ferroelectric liquid crystal 103 which is sandwiched with the circuit substrate 100 and the opposite substrate 102. Each liquid crystal driving circuit 101 includes a plurality of photodetectors 107 and a logic circuit 106 which is supplied with outputs of the photodetectors 107. Each photodetector 107 is a voltage divider consisting of a photoconductor 104 and a resistor 105 having no optical sensibility. The logic circuit 106 is either logic circuit of AND, OR, and exclusive OR circuits.

Figure 2:
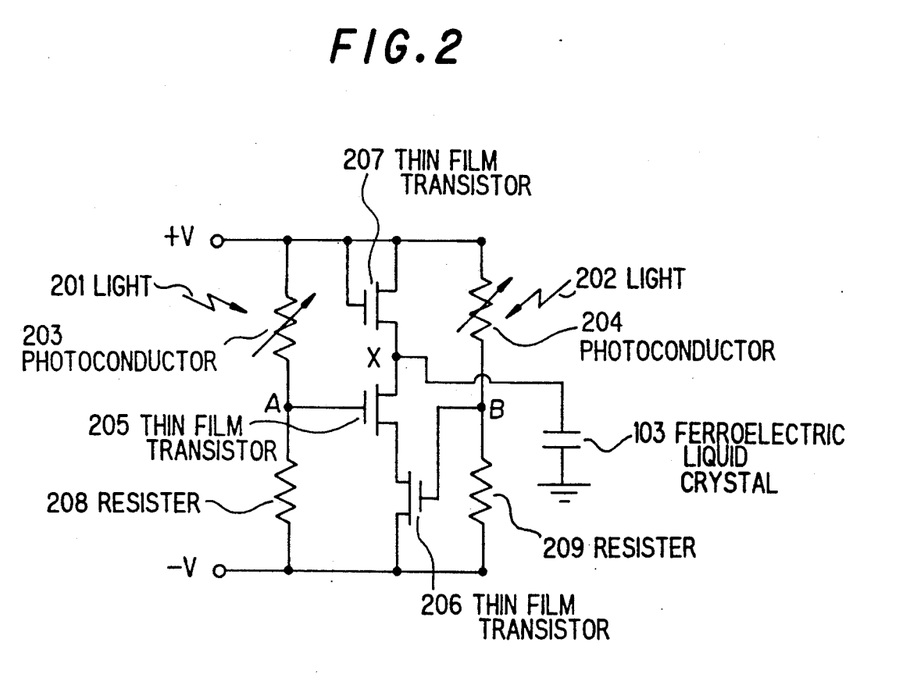
FIG. 2 is a circuitry diagram of the optically addressed liquid crystal light valve in the preferred embodiment in case that it includes an AND circuit as a logic circuit.

FIG. 2 shows the optically addressed liquid crystal light valve of FIG. 1 including a liquid crystal driving circuit 101 which has two photodetectors in the preferred embodiment in case that it includes an AND circuit as the logic circuit. The liquid crystal driving circuit 101 includes two photoconductors 203 and 204, two resistors 208 and 209, and three thin film transistors 205 to 207. The photoconductor 203 and the resistor 208 composing the first photodetector are connected serially, while the photoconductor 204 and the resistor 209 composing the second photodetector are connected serially. Each one terminal of the photoconductors 203 and 204 is connected to a high voltage +V and each of the other terminals is connected to nodal points A and B, respectively. Each one terminal of the resistors 208 and 209 are connected to a low voltage −V and each of the other terminals is connected to the nodal points A and B, respectively. The thin film transistor 205 is connected at a gate to the nodal point A, at a source to a drain of the thin film transistor 206, and at a drain to an output point X which is connected to the ferroelectric liquid crystal 103. The thin film transistor 206 is connected at a gate to the nodal point B and at a source to the low voltage −V. The thin film transistor 207 is connected at a gate and a source to the high voltage +V and at a drain to the output point X.

In operation, the thin film transistor 207 is constantly at ON state, because it is supplied with a high voltage constantly at the gate. On the other hand, the thin film transistors 205 and 206 become at ON state when lights 201 and 202 are irradiated to the photoconductors 203 and 204 to be detected, respectively. Therefore, the output point X becomes level of low voltage −V only if both the lights 201 and 202 are irradiated to the photoconductors 203 and 204 to make both the thin film transistors 205 and 206 at ON state, otherwise the output point X remains level of high voltage +V. Consequently, the output voltage of the output point X, as a result of an optical logic AND process, is applied to the ferroelectric liquid crystal 103.

Figure 3:
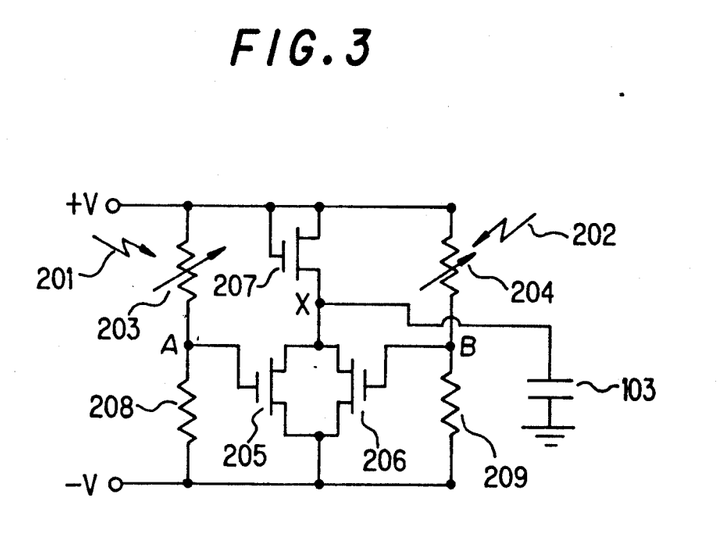
FIG. 3 is a circuitry diagram of the optically addressed liquid crystal light valve in the preferred embodiment in case that it includes an OR circuit as a logic circuit.

FIG. 3 shows the optically addressed liquid crystal light valve of FIG. 1 including a liquid crystal driving circuit 101 which has two photodetectors in the preferred embodiment in case that it includes an OR circuit as a logic circuit. The basic structure is the same as that in FIG. 2, except that the thin film transistors 205 and 206 are connected in parallel each other. In more detail, the thin film transistors 205 and 206 are connected at sources to a low voltage −V in common and at drains to an output point X in common.

In operation, the thin film transistor 207 is constantly at ON state, and the thin film transistors 205 and 206 become at ON state when lights 201 and 202 are irradiated to the photoconductors 203 and 204, respectively, as like in FIG. 2. However, the output point X becomes level of low voltage −V if both or either of the lights 201 and 202 are irradiated to the photoconductors 203 and 204 to make both or either of the thin film transistors 205 and 206 at ON state.

The output point X remains level of high voltage +V only if neither of the photoconductors 203 and 204 detect light. Consequently, the output voltage of the output point X, as a result of an optical logic OR process, is applied to the ferroelectric liquid crystal 103.

Figure 4:
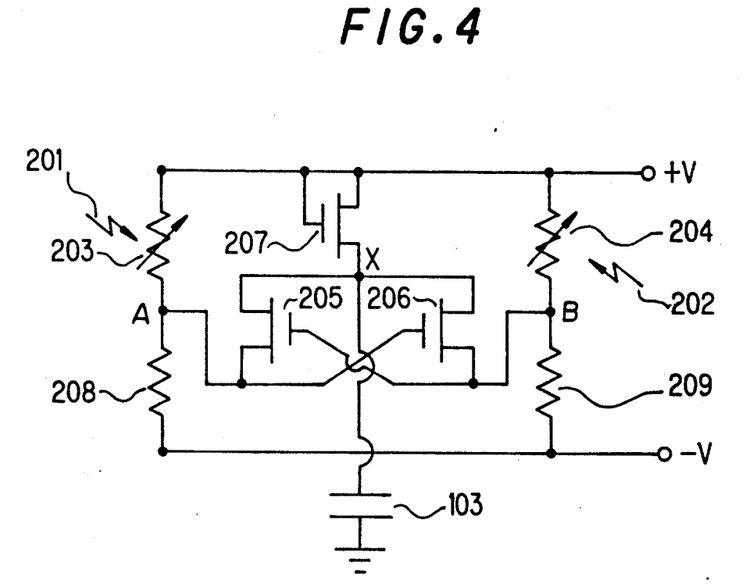
FIG. 4 is a circuitry diagram of the optically addressed liquid crystal light valve in the preferred embodiment in case that it includes an exclusive OR circuit as a logic circuit.

FIG. 4 shows the optically addressed liquid crystal light valve of FIG. 1 including a liquid crystal driving circuit 101 which has two photodetectors in the preferred embodiment in case that it includes an exclusive OR circuit as a logic circuit. The basic structure is the same as that in FIG. 2, except that connections of the thin film transistors 205 and 206 are different. In more detail, the thin film transistor 205 is connected at a gate to a nodal point B, at a source to a nodal point A, and at a drain to an output point X, while the thin film transistor 206 is connected at a gate to the nodal point A, at a source to the nodal point B, and at a drain to the output point X.

In operation, the thin film transistor 207 is constantly at ON state, and the thin film transistors 205 and 206 become at ON state when lights 201 and 202 are irradiated to the photoconductors 203 and 204, respectively, as like in FIG. 2. When both the lights 201 and 202 are irradiated to the photoconductors 203 and 204, both the thin film transistors 205 and 206 become at ON state and both the nodal points A and B become high level, so that the output point X becomes high level. When neither of the lights 201 and 202 is irradiated thereto, both the thin film transistors 205 and 206 become at OFF state, so that the output point X becomes high level. When only the light 201 is irradiated thereto, the thin film transistor 205 becomes at ON state and the thin film transistor 206 becomes at OFF state, while the nodal point B remains low level, so that the output point X becomes low level. In the same manner, the output point X becomes low level when only the light 202 is irradiated thereto. Consequently, the output voltage of the output point X, as a result of an optical logic exclusive OR process, is applied to the ferroelectric liquid crystal 103.

In the optically addressed liquid crystal light valve, an output voltage of the logic circuit 106 is applied to the ferroelectric liquid crystal 103. The output voltage thereof changes between positive and negative potentials relative to the voltage of the opposite substrate 102 in accordance with the results of the arithmetic processes, so that inversion of an electric field applied to the ferroelectric liquid crystal 103 occurs to carry out switching the liquid crystal. Such mechanism contributes high speed of response. Further, the range of voltage changes applied to the liquid crystal is wide, so that high contrast can be obtained therein.

Additionally, the optical arithmetic processes of the light signals are carried out by the logic circuit 106 which is an electric logic circuit. Such circuits can include any of AND, OR, and exclusive OR circuits in one light valve and can be positioned on any place thereof, so that different kinds of arithmetic processes of AND, OR, and exclusive OR can ben carried out simultaneously.

Figure 5:
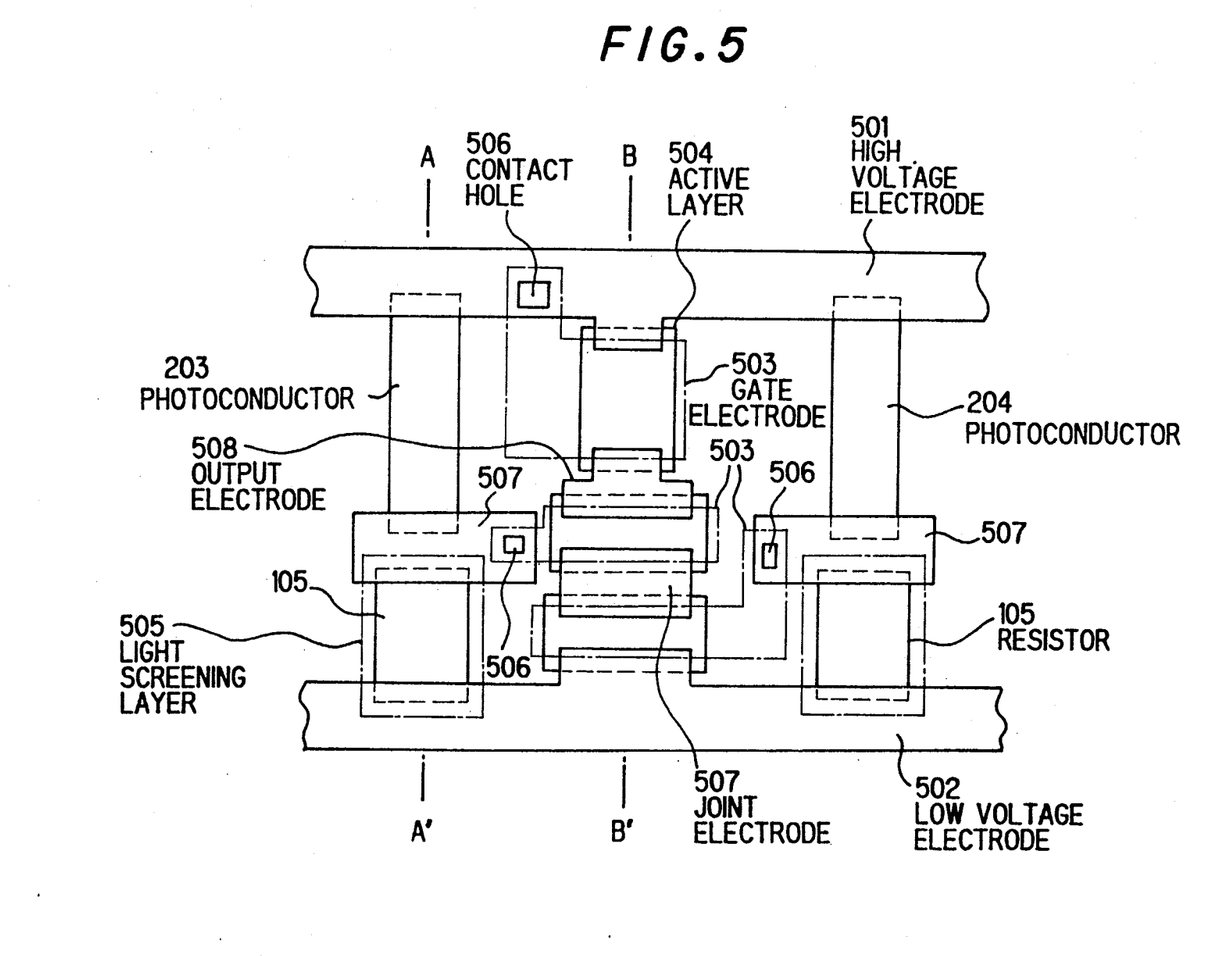
FIG. 5 is a plan view illustrating the optically addressed liquid crystal light valve in the preferred embodiment in case that it includes an AND circuit as a logic circuit.
Figure 6A:
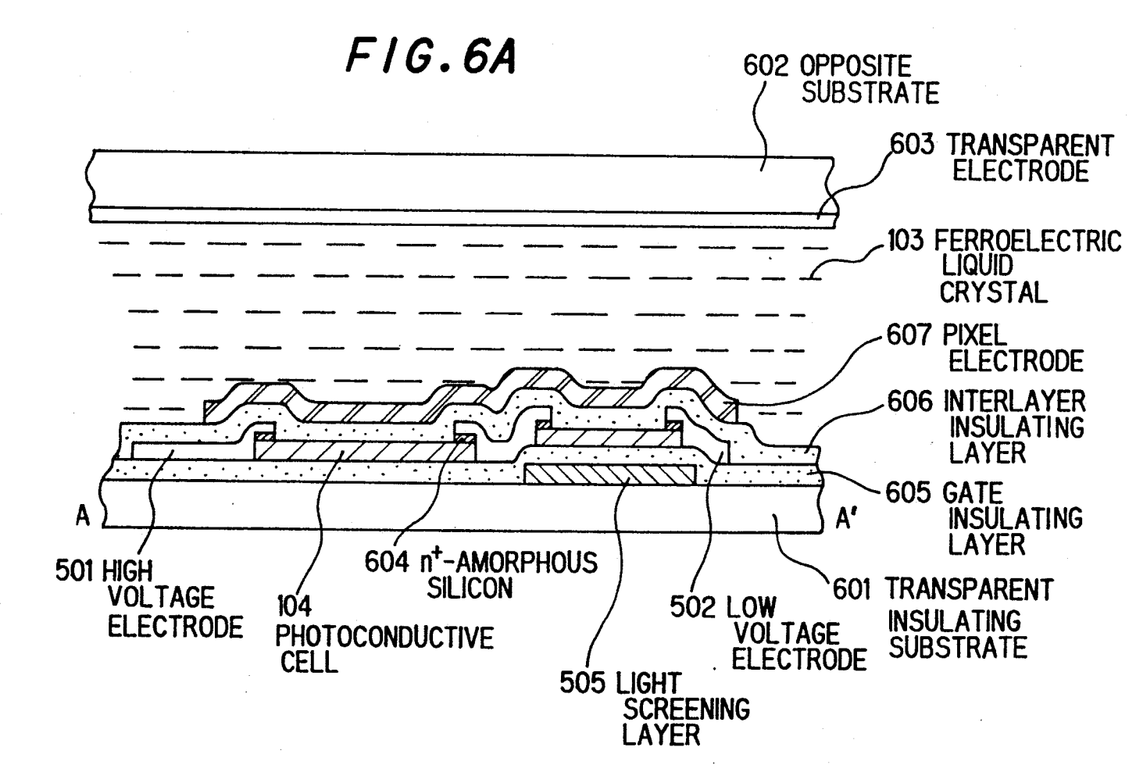
FIGS. 6A and 6B are cross-sectional views taken on lines A—A' and B—B' of FIG. 5, respectively.
Figure 6B:
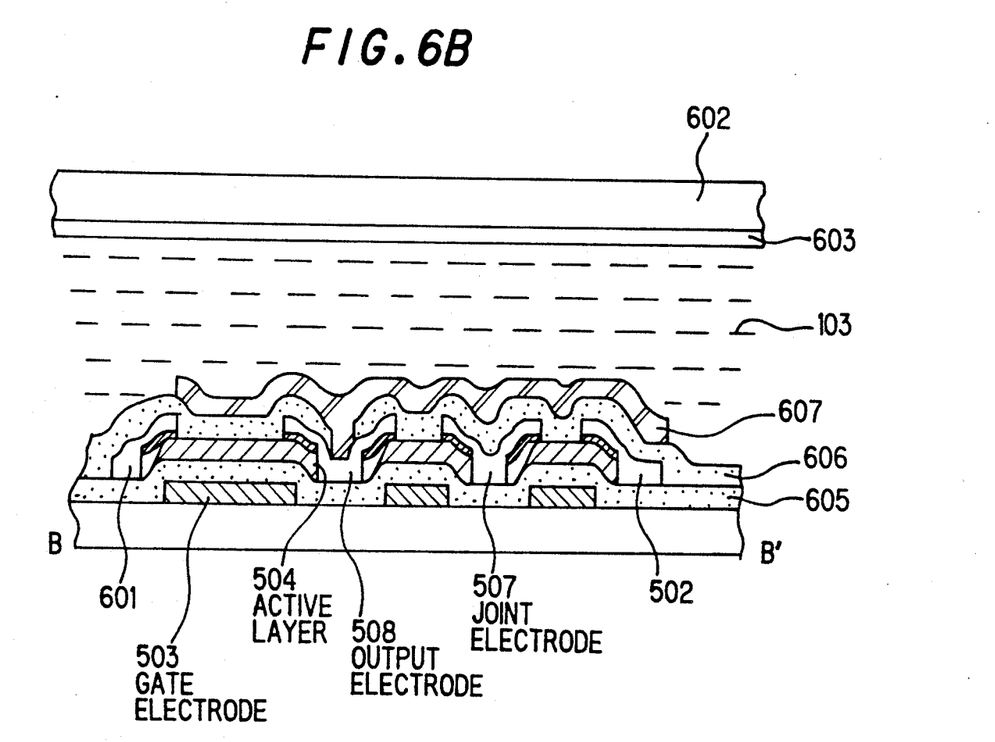

FIG. 5 is shows the practical structure of the optically addressed liquid crystal light valve in the preferred embodiment in case that it includes an AND circuit as a logic circuit, and FIGS. 6A and 6B are cross-sectional views taken on lines A—A' and B—B' of FIG. 5, respectively.

The fabrication process thereof will be explained. Here, photoconductors, resistors and active layers of thin film transistors consist of an amorphous silicon layer. First, a chromium layer is formed on a transparent insulating substrate 601 by sputtering. Then, the chromium layer is etched to have a predetermined pattern to form a light screening layer 505 and a gate electrode 503. Next, a silicon nitride layer is formed by mixing and decomposing silane ($SiH_4$) and ammonia ($NH_3$) by glow discharge. Then, an amorphous silicon layer is formed by discomposing the silane. Then, an $n^+$-amorphous silicon layer 604 including a large amount of phosphorus for ohmic contact with electrodes is formed by mixing and decomposing the silane and phosphine ($PH_3$). Then, the $n^+$-amorphous silicon layer 604 is patterned to form photoconductors 203 and 204, a resistor 105, and an active layer 504 of a thin film transistor.

Next, contact holes 506 are formed through the gate electrode 503 and a high voltage electrode 501 to be formed thereafter and through the gate electrode 503 and a joint electrode 507 to be formed thereafter. Then, a chromium layer is formed by sputtering and patterned to form a high voltage electrode 501, a low voltage electrode 502, a joint electrode 507 and an output electrode 508. Then, the $n^+$-amorphous silicon layer 604 is removed by etching. Then, an interlayer insulating layer 606 of silicon nitride is formed on the fabricated surface. Then, the contact holes 506 are formed again through the output electrode 508 and a pixel electrode 607 to be formed thereafter. Then, a chromium layer is formed by sputtering and patterned to form a pixel electrode 607. Next, an orientating layer of polyimide is formed on the transparent insulating layer 601 by spin coating and then the surface thereof is rubbed.

Next, an opposite substrate 602 provided with a transparent electrode 603 which is rubbed is assembled with the transparent insulating substrate 601 thus fabricated so that the rubbing directions of the two substrates are parallel but opposite (anti-parallel), and ferroelectric liquid crystal 103 is poured therebetween. Thus, the optically addressed liquid crystal light valve is fabricated. Silicon oxide or organic insulating layers such as polyimide may be used as insulating layers. An LB layer may be used as the orientating layer.

Figure 7:
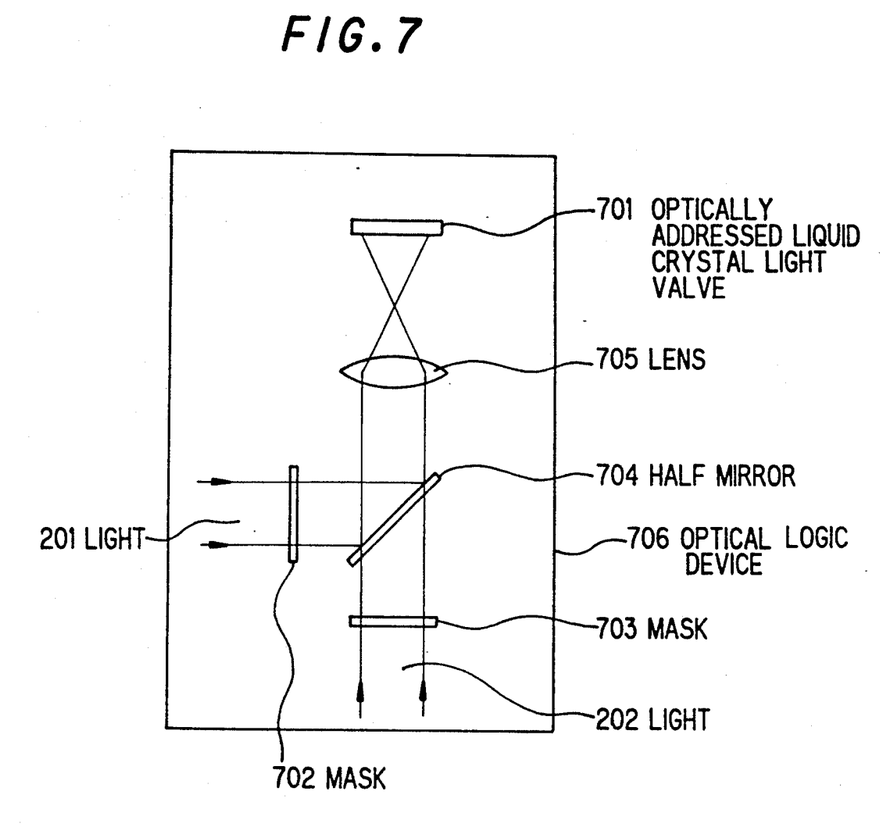
FIG. 7 is a schematic illustration of an optical logic device in a first preferred embodiment according to the invention.
Figure 8A:
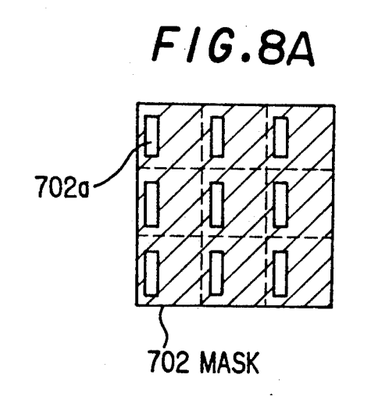
FIGS. 8A and 8B are plan views illustrating masks in FIG. 7.
Figure 8B:
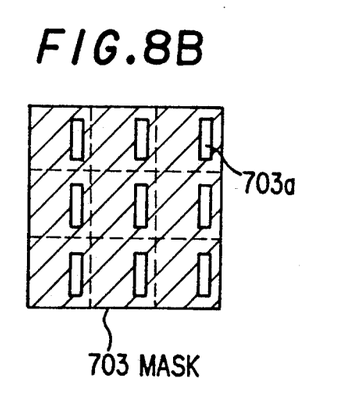

Next, an optical logic device using the optically addressed liquid crystal light valve will be explained. FIG. 7 shows an optical logic device in a first preferred embodiment. The optical logic device 706 includes an optically addressed liquid crystal light valve 701, two masks 702 and 703, a half mirror 704 and a lens 705. The masks 702 and 703 have openings 702a and 703a by which lights passing therethrough are separated to be transmitted to corresponding photoconductors of the optically addressed liquid crystal light valve 701, as shown in FIGS. 8A and 8B, respectively.

In operation, lights 201 and 202 which are two-dimensional input images such as a still pattern or a CRT picture are irradiated to the masks 702 and 703, respectively, where space-separation of the two lights is carried out. Then, the lights 201 and 202 are combined by the half mirror 704, and the combined light is focused by the lens 705 to become an input light for the light valve 701. Then, the optical arithmetic processes are carried out in the light valve 701 as explained before. That is, the masks 702 and 703 are illustrated to have 3×3 picture cell regions each consisting of the opening 702a or 703a, respectively. In the optical arithmetic processes, logic calculations such as AND, OR, exclusive OR, etc. are carried out between respective two input lights transmitted through the openings 702a and 703a of each corresponding picture cell regions.

Figure 9:
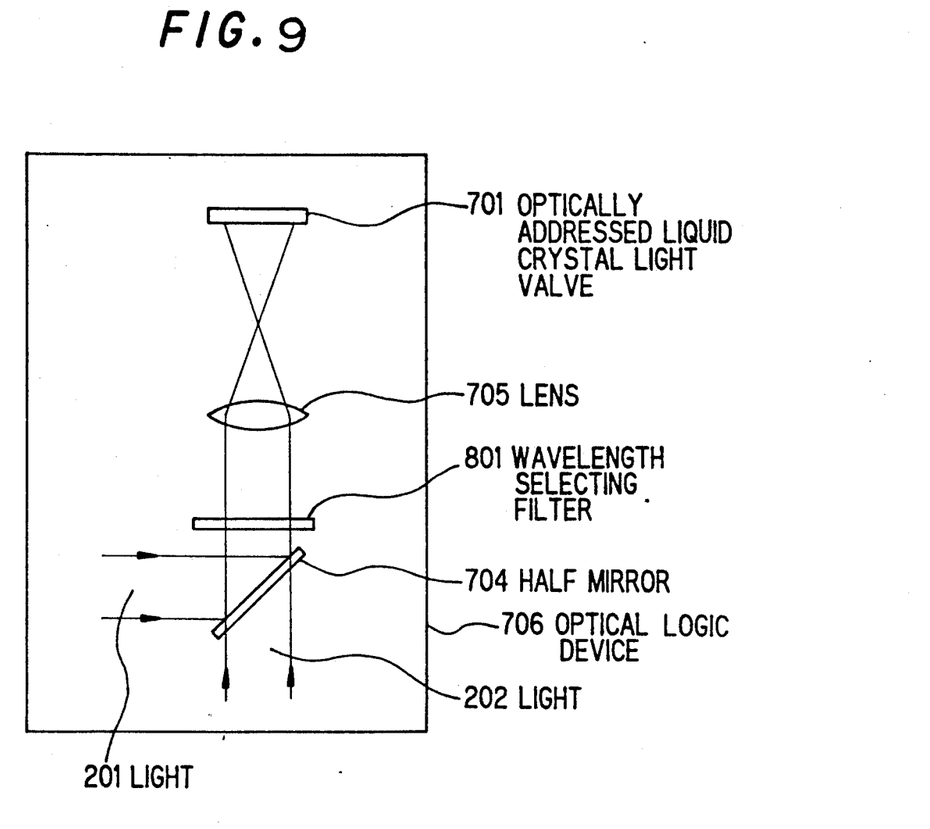
FIG. 9 is a schematic illustration of an optical logic device in a second preferred embodiment according to the invention.
Figure 10:
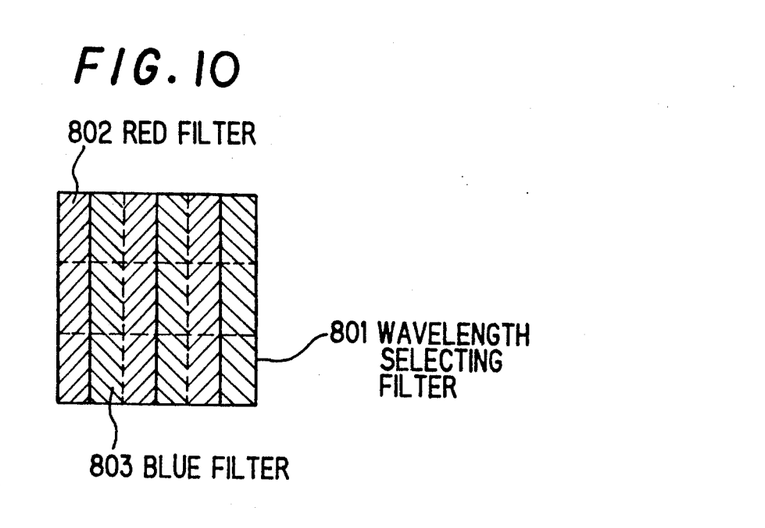
FIG. 10 is a plan view illustrating a mask in FIG. 9.

FIG. 9 shows an optical logic device in a second preferred embodiment. The optical logic device 706 includes an optically addressed liquid crystal light valve 701, a half mirror 704, a wavelength selecting filter 801 and a lens 705. The wavelength selecting filter 801 includes red filters 802 and blue filters 803 which respectively transmit red and blue lights and are arranged in position so that light passing therethrough are separated to be transmitted to corresponding photoconductors of the light valve 701, as shown in FIG. 10.

In operation, lights 201 and 202 which are red and blue lights, respectively, are irradiated to the half mirror 704 where the two lights 201 and 202 are combined. The combined light passes through the wavelength selecting filter 801, where the space-separation of the two lights is carried out, and then the light is focused by the lens 705 to become an input light for the light valve 701. Then, the optical arithmetic processes are carried out between the red and blue lights in the light valve 701 as explained before.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An optically addressed liquid crystal light valve, comprising:
   a first substrate on which a plurality of liquid crystal driving circuits are formed;
   a second substrate provided with a transparent electrode; and
   a ferroelectric liquid crystal sandwiched between said first and second substrates;
   wherein each said liquid crystal driving circuit comprises;
   a plurality (n) of photodetectors for detecting lights to be converted to electric signals;
   a logic circuit controlled by said electric signals supplied from said photodetectors; and
   pixel electrodes applied with a predetermined voltage as a result of a logic calculation in said logic circuit, whereby a predetermined electric field is applied across said transparent electrode and each said pixel electrode.

2. An optically addressed liquid crystal light valve, according to claim 1, wherein:
   said photodetector comprises a voltage dividing circuit consisting of a photoconductor and a resistor having no optical sensibility.

3. An optically addressed liquid crystal light valve, according to claim 2, wherein:
   said photoconductor comprises amorphous silicon.

4. An optically addressed liquid crystal light valve, according to claim 1, wherein:
   said logic circuit comprises a circuit selected from a group consisting of AND, OR, and exclusive OR circuits.

5. An optically addressed liquid crystal light valve, according to claim 1, wherein:
   said plurality of liquid crystal driving circuits are arranged one-dimensionally or two-dimensionally as pixels.

6. An optical logic device, comprising:
   an optically addressed liquid crystal light valve comprising a first substrate on which a plurality of liquid crystal driving circuits are formed, a second substrate provided with a transparent electrode and a ferroelectric liquid crystal sandwiched between said first and second substrates, wherein each said liquid crystal driving circuit comprises a plurality (n) of photodetectors for detecting lights to be converted to electric signals, a logic circuit controlled by said electric signals supplied from said photodetectors, and pixel electrodes applied with a predetermined voltage as a result of a logic calculation in said logic circuit, whereby a predetermined electric field is applied across said transparent electrode and each said pixel electrode;
   a plurality (n) of masks for selectively transmit a plurality (n) of lights to corresponding photodetectors of said optically addressed liquid crystal light valve;
   an optical combining system for combining said plurality (n) of lights; and
   an optical focusing system for focusing said combined light.

7. An optical logic device, comprising:
   an optically addressed liquid crystal light valve comprising a first substrate on which a plurality of liquid crystal driving circuits are formed, a second substrate provided with a transparent electrode and a ferroelectric liquid crystal sandwiched between said first and second substrates, wherein each said liquid crystal driving circuit comprises a plurality (n) of photodetectors for detecting lights to be converted to electric signals, a logic circuit controlled by said electric signals supplied from said photodetectors, and pixel electrodes applied with a predetermined voltage as a result of a logic calculation in said logic circuit, whereby a predetermined electric field is applied across said transparent electrode and each said pixel electrode;
   an optical combining system for combining said plurality (n) of lights;
   a wavelength selecting filter including a plurality (n) of regions each transmit a light having a specific wavelength among said plurality of lights to a corresponding photodetector of said optically addressed liquid crystal light valve; and
   an optical focusing system for focusing said light having said specific wavelength on said corresponding photodetector.

* * * * *